(12) United States Patent
Harvey et al.

(10) Patent No.: US 8,458,176 B2
(45) Date of Patent: Jun. 4, 2013

(54) METHOD AND SYSTEM FOR PROVIDING A DIRECTORY OVERLAY

(75) Inventors: Richard H. Harvey, Ringwood East (AU); Ronald W. Ramsay, Ringwood (AU); Justin J. McDonald, Balwyn (AU)

(73) Assignee: CA, Inc., Islandia, NY (US)

( * ) Notice: Subject to any disclaimer, the term of this patent is extended or adjusted under 35 U.S.C. 154(b) by 1137 days.

(21) Appl. No.: 11/270,793

(22) Filed: Nov. 9, 2005

(65) Prior Publication Data

US 2007/0112789 A1    May 17, 2007

(51) Int. Cl.
*G06F 12/00* (2006.01)
*G06F 17/00* (2006.01)

(52) U.S. Cl.
USPC ............................................ 707/731; 707/828

(58) Field of Classification Search
None
See application file for complete search history.

(56) References Cited

U.S. PATENT DOCUMENTS

| | | | |
|---|---|---|---|
| 4,979,109 A * | 12/1990 | Tanaka et al. ................. | 707/100 |
| 5,794,232 A | 8/1998 | Mahlum et al. | |
| 5,870,734 A * | 2/1999 | Kao ................. | 707/2 |
| 5,960,442 A * | 9/1999 | Pickering .................. | 707/104.1 |
| 5,987,471 A | 11/1999 | Bodine et al. | |
| 5,999,948 A | 12/1999 | Nelson et al. | |
| 6,052,681 A | 4/2000 | Harvey .............. | 707/3 |
| 6,115,549 A | 9/2000 | Janis et al. | |
| 6,286,010 B1 | 9/2001 | Ramachandran et al. | |
| 6,345,266 B1 * | 2/2002 | Ganguly et al. ........ | 707/999.001 |
| 6,347,312 B1 | 2/2002 | Byrne et al. | |
| 6,453,319 B1 | 9/2002 | Mattis et al. | |
| 6,560,644 B1 | 5/2003 | Lautmann et al. | |
| 6,615,223 B1 | 9/2003 | Shih et al. ..................... | 707/201 |
| 6,665,674 B1 | 12/2003 | Buchanan et al. | |
| 6,721,758 B1 | 4/2004 | Jex et al. | |
| 6,748,374 B1 | 6/2004 | Madan et al. ..................... | 707/3 |
| 6,768,988 B2 | 7/2004 | Boreham et al. ................. | 707/3 |
| 6,842,903 B1 * | 1/2005 | Weschler ..................... | 719/328 |
| 6,980,985 B1 | 12/2005 | Amer-Yahia et al. ............. | 707/4 |
| 7,003,631 B2 | 2/2006 | Rowlands | |
| 7,016,907 B2 | 3/2006 | Boreham et al. ............. | 707/101 |
| 7,082,308 B1 | 7/2006 | Kaura et al. | |
| 7,107,297 B2 | 9/2006 | Yellepeddy et al. | |
| 7,149,743 B2 | 12/2006 | Colwill, Jr. .................. | 707/102 |
| 7,310,650 B1 | 12/2007 | Felsted et al. | |

(Continued)

FOREIGN PATENT DOCUMENTS

| JP | A 55 157053 | 6/1980 |
|---|---|---|
| JP | 63 056891 A | 3/1988 |
| JP | 03 048322 A | 3/1991 |
| JP | 04 117518 A | 4/1992 |

OTHER PUBLICATIONS

Venkatasubramanian et al. "Design and Implementation of a safe, Reflective Middleware Framework", Dept. of Information & Computer Science University of California, Irvine, CA 92697-3425, USA.*

(Continued)

*Primary Examiner* — Kuen S Lu
*Assistant Examiner* — Berhanu Mitiku
(74) *Attorney, Agent, or Firm* — Baker Botts, L.L.P.

(57) ABSTRACT

According to one embodiment, a method for providing an enhanced directory service includes providing a supplemental layer between a user and a reference layer, the supplemental layer providing the user with any directory functionality provided by the reference layer as well as additional directory functionality.

38 Claims, 7 Drawing Sheets

U.S. PATENT DOCUMENTS

| | | |
|---|---|---|
| 7,315,854 B2 | 1/2008 | Kumar .............................. 707/3 |
| 2001/0034733 A1 | 10/2001 | Prompt et al. |
| 2001/0039549 A1 | 11/2001 | Eng et al. |
| 2002/0032684 A1 | 3/2002 | Kobayashi et al. |
| 2002/0147857 A1 | 10/2002 | Sanchez, II et al. |
| 2002/0188614 A1 | 12/2002 | King .............................. 707/100 |
| 2003/0055917 A1 | 3/2003 | Boreham et al. .............. 709/220 |
| 2003/0073497 A1 | 4/2003 | Nelson |
| 2003/0078937 A1 | 4/2003 | Boreham et al. .............. 707/102 |
| 2003/0088656 A1 | 5/2003 | Wahl et al. |
| 2003/0110188 A1* | 6/2003 | Howard et al. ............... 707/200 |
| 2003/0115196 A1 | 6/2003 | Boreham et al. ................... 707/4 |
| 2003/0130873 A1 | 7/2003 | Nevin et al. |
| 2003/0144894 A1 | 7/2003 | Robertson et al. |
| 2003/0149934 A1 | 8/2003 | Worden |
| 2003/0195970 A1 | 10/2003 | Dinh et al. .................... 709/229 |
| 2003/0208478 A1 | 11/2003 | Harvey .............................. 707/3 |
| 2004/0006511 A1* | 1/2004 | Montemer ...................... 705/14 |
| 2004/0030828 A1 | 2/2004 | Yamamoto et al. |
| 2004/0059719 A1* | 3/2004 | Gupta et al. ....................... 707/3 |
| 2004/0064502 A1 | 4/2004 | Yellepeddy et al. |
| 2004/0064650 A1 | 4/2004 | Johnson |
| 2004/0064706 A1 | 4/2004 | Lin et al. |
| 2004/0078623 A1 | 4/2004 | Totolos, Jr. |
| 2004/0181758 A1 | 9/2004 | Shinpuku et al. |
| 2004/0215619 A1 | 10/2004 | Rabold |
| 2004/0249951 A1 | 12/2004 | Grabelsky et al. |
| 2005/0021498 A1 | 1/2005 | Boreham et al. |
| 2005/0027734 A1 | 2/2005 | MacLeod et al. |
| 2005/0044103 A1 | 2/2005 | MacLeod et al. |
| 2005/0044110 A1 | 2/2005 | Herzenberg et al. |
| 2005/0065977 A1 | 3/2005 | Benson et al. .............. 707/104.1 |
| 2005/0076041 A1 | 4/2005 | Stakutis et al. ............... 707/100 |
| 2005/0102297 A1* | 5/2005 | Lloyd et al. ................... 707/100 |
| 2005/0114381 A1 | 5/2005 | Borthakur et al. ............ 707/102 |
| 2005/0193173 A1 | 9/2005 | Ring et al. |
| 2005/0216448 A1 | 9/2005 | Talib et al. ......................... 707/3 |
| 2005/0267857 A1 | 12/2005 | Harvey et al. |
| 2005/0267858 A1 | 12/2005 | Harvey et al. |
| 2005/0267859 A1 | 12/2005 | Harvey et al. |
| 2005/0273457 A1 | 12/2005 | Harvey et al. |
| 2005/0289174 A1 | 12/2005 | Kolli et al. .................... 707/102 |
| 2006/0106848 A1 | 5/2006 | Harvey et al. |
| 2006/0117073 A1 | 6/2006 | Bosworth et al. ............. 707/201 |
| 2006/0117262 A1* | 6/2006 | Nagayama ..................... 715/734 |
| 2006/0129415 A1 | 6/2006 | Thukral et al. |
| 2006/0136805 A1 | 6/2006 | Conn et al. |
| 2006/0173873 A1 | 8/2006 | Prompt et al. |
| 2006/0179223 A1* | 8/2006 | Clark et al. ................... 711/122 |
| 2006/0230145 A1 | 10/2006 | Zarakhovsky et al. |
| 2006/0294114 A1 | 12/2006 | Harvey et al. |
| 2007/0106691 A1 | 5/2007 | Harvey et al. |
| 2007/0106699 A1 | 5/2007 | Harvey et al. |
| 2007/0106815 A1 | 5/2007 | Harvey et al. |
| 2007/0112790 A1 | 5/2007 | Harvey et al. |
| 2007/0112791 A1 | 5/2007 | Harvey et al. |
| 2007/0112812 A1 | 5/2007 | Harvey et al. |
| 2007/0112877 A1 | 5/2007 | Harvey et al. |
| 2007/0118632 A1 | 5/2007 | Harvey et al. |

OTHER PUBLICATIONS

Sun Microsystems, Inc. "Java Naming and Directory Interface Application Programming Interface (JNDI API)" JNDI 1.2/JavaTM 2 Platform, Standard Edition, v 1.3, Jul. 14, 1999, Sun Microsystems Inc., 901 San Antonio Road, Palo Alto, CA 94303.*

USPTO Office Action, U.S. Appl. No. 11/270,320, inventor Harvey, 22 pages, Jan. 27, 2009.

UPSTO Office Action, U.S. Appl. No. 11/270,188, inventor Harvey, 20 pages, Apr. 15, 2009.

USPTO Office Action, U.S. Appl. No. 11/270,896, inventor Harvey, 24 pages, Apr. 16, 2009.

USPTO Office Action, U.S. Appl. No. 11/270,795, inventor Harvey, 20 pages, Apr. 29, 2009.

USPTO Office Action, U.S. Appl. No. 11/270,320, inventor Harvey, 21 pages, Jul. 9, 2009.

Notification of Transmittal of International Search Report and the Written Opinion of the International Searching Authority, or the Declaration; International Application No. PCT/US2006/043278; 14 pages, Mar. 22, 2007.

Notification of Transmittal of the International Search Report and the Written Opinion of the International Searching Authority for International Application No. PCT/US2005/017801, filed May 20, 2005, (11 pages), Nov. 4, 2005.

Sun Microsystems Inc., "*Administrator's Guide Version 5.2*", Sun™ One Directory Proxy Server, Online!, XP-002350693 (66 pages), Jun. 2000.

PCT Invitation to Pay Additional Fees, International application No. PCT/US2006/043827; 5 pages, May 16, 2007.

"Microsoft Windows NT Server Active Directory Service Interfaces: The Easy way to Access and Mange LDAP-Based Directories;" Microsoft Windows NT Server, pp. 1-17, XP000863814, 1997.

Jehan Wickramasuriya, et al.; "A Directory Enabled Middleware Framework for Distributed Systems;" Department of Information & Computer Science; XP002429122; University of California, Invine, CA; 8 pages, 2003.

C.S. Yang, et al.; "Design and Implementation of Secure Web-based LDAP Management System;" XP-002429123; IEEE; pp. 259-264, 2001.

Silver, Daniel L., et al.; "X.500 Directory Schema Management;" XP-002429124; IEEE; pp. 393-400, 1994.

USPTO Office Action, U.S. Appl. No. 11/270,320, inventor Harvey, Sep. 21, 2009.

USPTO Office Action, U.S. Appl. No. 11/270,794, inventor Harvey, Oct. 20, 2009.

USPTO Office Action, U.S. Appl. No. 11/270,896, inventor Harvey, Oct. 20, 2009.

USPTO Office Action, U.S. Appl. No. 11/270,794, Sep. 17, 2008.
USPTO Office Action, U.S. Appl. No. 11/270,188, Oct. 27, 2008.
USPTO Office Action, U.S. Appl. No. 11/270,896, Oct. 31, 2008.
USPTO Office Action, U.S. Appl. No. 11/270,320, Nov. 5, 2008.
USPTO Office Action, U.S. Appl. No. 11/270,795, Nov. 12, 2008.

F.W. Allen et al., "The Integrated Dictionary/Directory System," Computing Surveys, vol. 14, No. 2, pp. 245-286, Jun. 1982.

J.F. Roddick, "A survey of schema versioning issues for database systems," El Servier Science B.V., Information and Software Technology, 0950-5849, 37 (7), pp. 383-393, © 1995.

J. Madhaven, et al., "Generic Schema Matching with Cupid," Microsoft Research, Technical Report, MSR-TR-2001-58, 15 pages, Aug. 2001.

S-E Lautemann, "An Introduction to Schema Versioning in OODBMS," 0-8186-7662-0, IEEE, 8 pages, © 1996.

J. Abbey, et al., "Ganymede an Extensible and Customizable Directory Management Framework," USENIX, 1998 LISA XII—Boston, MA, 23 pages, Dec. 6-11, 1998.

S. Amer-Yahia, et al., "Distributed Evaluation of Network Directory Queries," IEEE Transactions on Knowledge and Data Engineering, vol. 16, No. 4, pp. 474-486, Apr. 2004.

T.A. Howes, "The Lightweight Directory Access Protocol: X.500 Lite," CITI Technical Report 95-8, Center for Information Technology Integration, University of Michigan, 10 pgs, Jul. 27, 1995.

Harvey et al., "Method and System for Writing Data to a Directory" U.S. Appl. No. 11/270,188, filed Nov. 9, 2005.

Harvey et al., "Method and System for Configuring a Supplemental Directory" U.S. Appl. No. 11/270,794, filed Nov. 9, 2005.

Harvey et al., "Method and System for Providing Enhanced Read Performance for a Supplemental Directory" U.S. Appl. No. 11/270,795, filed Nov. 9, 2005.

Harvey et al., "Method and System for Improving Write Performance in a Supplemental Directory" U.S. Appl. No. 11/270,896, filed Nov. 9, 2005.

Harvey, et al., "Method and System for Automatic Registration of Attribute Types" U.S. Appl. No. 11/270,320, filed Nov. 9, 2005.

U.S. Patent and Trademark Office, Office Action for U.S. Appl. No. 11/270,188, filed Nov. 9, 2005, Electronically Mailed Apr. 17, 2008.

U.S. Patent and Trademark Office, Office Action for U.S. Appl. No. 11/270,794, filed Nov. 9, 2005, Richard Hans Harvey et al., Electronically Mailed Mar. 17, 2008.

U.S. Patent and Trademark Office, Office Action for U.S. Appl. No. 11/270,795, filed Nov. 9, 2005, Richard Hans Harvey et al., Electronically Mailed May 1, 2008.
U.S. Patent and Trademark Office, Office Action for U.S. Appl. No. 11/270,896, filed Nov. 9, 2005, Richard Hans Harvey et al., Electronically Mailed Apr. 16, 2008.
U.S. Patent and Trademark Office, Office Action for U.S. Appl. No. 11/270,320, filed Nov. 9, 2005, Richard Hans Harvey et al., Electronically Mailed May 30, 2008.
Notification of Transmittal of International Search Report and the Written Opinion of the International Searching Authority, or the Declaration; International Application No. PCT/US2006/043827, 29 pages, Jul. 3, 2008.
USPTO Office Action for U.S. Appl. No. 11/270,794, inventor Harvey, Filing date Nov. 9, 2005, 20 pages, Mar. 25, 2009.
Kuechler, D., et al., "An Architecture to Support Communities of Interest Using Directory Services Capabilities," White Paper, Proceedings of the 36th Hawaii International Conference on System Sciences, 10 pages, 2003.
Leung, "An Object-Oriented Approach to Directory Systems," IEEE Region 10 Conference on Computer and Commercial Systems, pp. 736-740, Sep. 1990.
USPTO Office Action, U.S. Appl. No. 11/270,188, inventor Harvey, Dec. 9, 2009.
USPTO Office Action, U.S. Appl. No. 11/270,795, filed Nov. 9, 2005, inventor Harvey, Jan. 15, 2010.
USPTO Office Action, U.S. Appl. No. 11/270,320, filed Nov. 9, 2005, Feb. 22, 2010.
USPTO Office Action, U.S. Appl. No. 11/270,896, filed Nov. 9, 2005, Mar. 18, 2010.
USPTO Advisory Action, U.S. Appl. No. 11/270,795, filed Nov. 9, 2005, Richard Hans Harvey et al., Apr. 7, 2010.
USPTO Final Office Action, U.S. Appl. No. 11/270,188, filed Nov. 9, 2005, inventor Richard Hans Harvey et al., Apr. 16, 2010.
USPTO Office Action, U.S. Appl. No. 11/270,794, filed Nov. 9, 2005, inventor Harvey, May 24, 2010.
USPTO Advisory Action, U.S. Appl. No. 11/270,896, filed Nov. 9, 2005, Richard Hans Harvey et al., Jun. 3, 2010.
U.S. Appl. No. 11/270,188, Response mailed Jul. 15, 2008, to Office Action dated Apr. 17, 2008.
U.S. Appl. No. 11/270,188, Response mailed Jan. 27, 2009, to Office Action dated Oct. 27, 2008.
U.S. Appl. No. 11/270,188, Notice of Appeal and Pre-Appeal Brief mailed Jul. 15, 2009.
U.S. Appl. No. 11/270,188, Notice of Panel Decision dated Sep. 30, 2009.
U.S. Appl. No. 11/270,188, RCE and Amendment filed Oct. 30, 2009.
U.S. Appl. No. 11/270,188, Response mailed Mar. 8, 2010 to Office Action dated Dec. 9, 2009.
U.S. Appl. No. 11/270,188, Response mailed Jun. 16, 2010 to Office Action dated Apr. 16, 2010.
U.S. Appl. No. 11/270,188, Advisory Action dated Jun. 30, 2010.
U.S. Appl. No. 11/270,188, Notice of Appeal and Pre-Appeal Brief mailed Jul. 13, 2010.
U.S. Appl. No. 11/270,188, Notice of Panel Decision dated Aug. 2, 2010.
U.S. Appl. No. 11/270,188, Appeal Brief filed Sep. 13, 2010.
U.S. Appl. No. 11/270,188, Examiner's Answer dated Oct. 14, 2010.
U.S. Appl. No. 11/270,188, Reply Brief filed Dec. 14, 2010.
U.S. Appl. No. 11/170,188, Appeal Docketing Notice dated Jan. 28, 2011.
U.S. Appl. No. 11/270,794, Preliminary Amendment mailed Feb. 7, 2006.
U.S. Appl. No. 11/270,794, Response mailed Jun. 10, 2008 to Office Action dated Mar. 17, 2008.
U.S. Appl. No. 11/270,794, Response mailed Dec. 16, 2008 to Office Action dated Sep. 17, 2008.
U.S. Appl. No. 11/270,794, Advisory Action dated Dec. 24, 2008.
U.S. Appl. No. 11/270,794, Response mailed Jan. 13, 2009 to Advisory Action dated Dec. 24, 2008.
U.S. Appl. No. 11/270,794, Response mailed Jun. 25, 2009 to Office Action dated Mar. 25, 2009.

U.S. Appl. No. 11/270,794, Response mailed Dec. 11, 2009 to Office Action dated Oct. 20, 2009.
U.S. Appl. No. 11/270,794, Response mailed Jul. 29, 2010 to Office Action dated May 24, 2010.
U.S. Appl. No. 11/270,794, Office Action dated Oct. 15, 2010.
U.S. Appl. No. 11/270,794, Response mailed Dec. 21, 2010 to Office Action dated Oct. 15, 2010.
U.S. Appl. No. 11/270,794, Office Action dated Mar. 17, 2011.
U.S. Appl. No. 11/270,794, Response mailed Jun. 1, 2011 to Office Action dated Mar. 17, 2011.
U.S. Appl. No. 11/270,794, Advisory Action dated Jun. 29, 2011.
U.S. Appl. No. 11/270,794, Notice of Appeal and Pre-Appeal Brief Request mailed Jul. 18, 2011.
U.S. Appl. No. 11/270,794, Notice of Panel Decision dated Aug. 15, 2011.
U.S. Appl. No. 11/270,794, Office Action dated Nov. 18, 2011.
U.S. Appl. No. 11/270,794, Response mailed Feb. 7, 2012 to Office Action dated Nov. 18, 2011.
U.S. Appl. No. 11/270,794, Notice of Allowance dated Jul. 20, 2012.
U.S. Appl. No. 11/270,795, Preliminary Amendment mailed Feb. 7, 2006.
U.S. Appl. No. 11/270,795, Response mailed Jul. 29, 2008 to Office Action dated May 1, 2008.
U.S. Appl. No. 11/270,795, Response mailed Feb. 10, 2009 to Office Action dated Nov. 12, 2008.
U.S. Appl. No. 11/270,795, Response mailed Jul. 29, 2009 to Office Action dated Apr. 29, 2009.
U.S. Appl. No. 11/270,795, Response mailed Mar. 15, 2010 to Office Action dated Jan. 15, 2010.
U.S. Appl. No. 11/270,795, Notice of Appeal and Pre-Appeal Brief mailed Jun. 14, 2010.
U.S. Appl. No. 11/270,795, Notice of Panel Decision dated Jul. 22, 2010.
U.S. Appl. No. 11/270,795, Appeal Brief mailed Aug. 23, 2010.
U.S. Appl. No. 11/270,795, Examiner's Answer dated Nov. 12, 2010.
U.S. Appl. No. 11/270,795, Reply Brief mailed Jan. 11, 2011.
U.S. Appl. No. 11/270,795, Appeal Docketing Notice dated Mar. 29, 2011.
U.S. Appl. No. 11/270,896, Preliminary Amendment filed Feb. 20, 2006.
U.S. Appl. No. 11/270,896, Response mailed Jul. 15, 2008 to Office Action dated Apr. 16, 2008.
U.S. Appl. No. 11/270,896, Response mailed Dec. 31, 2008 to Office Action dated Oct. 31, 2008.
U.S. Appl. No. 11/270,896, Advisory Action dated Jan. 22, 2009.
U.S. Appl. No. 11/270,896, Notice of Appeal and Pre-Appeal Brief dated Feb. 2, 2009.
U.S. Appl. No. 11/270,896, Notice of Panel Decision dated Feb. 11, 2009.
U.S. Appl. No. 11/270,896, Response mailed Jul. 16, 2009 to Office Action dated Apr. 16, 2009.
U.S. Appl. No. 11/270,896, Response mailed Jan. 8, 2010 to Office Action dated Oct. 20, 2009.
U.S. Appl. No. 11/270,896, Response mailed May 10, 2010 to Office Action dated Mar. 18, 2010.
U.S. Appl. No. 11/270,896, Notice of Appeal and Pre-Appeal Brief filed Jun. 18, 2010.
U.S. Appl. No. 11/270,896, Notice of Panel Decision dated Jul. 22, 2010.
U.S. Appl. No. 11/270,896, Office Action dated Sep. 22, 2010.
U.S. Appl. No. 11/270,896, Response mailed Dec. 16, 2010 to Office Action dated Sep. 22, 2010.
U.S. Appl. No. 11/270,896, Office Action dated Feb. 24, 2011.
U.S. Appl. No. 11/270,896, Response mailed Apr. 20, 2011 to Office Action dated Feb. 24, 2011.
U.S. Appl. No. 11/270,896, Advisory Action dated May 26, 2011.
U.S. Appl. No. 11/270,896, Advisory Action dated May 31, 2011.
U.S. Appl. No. 11/270,896, RCE filed Jun. 20, 2011.
U.S. Appl. No. 11/270,896, Office Action dated Dec. 9, 2011.
U.S. Appl. No. 11/270,896, Response mailed Mar. 8, 2012 to Office Action dated Dec. 9, 2011.
U.S. Appl. No. 11/270,896, Notice of Allowance dated Jul. 13, 2012.

U.S. Appl. No. 11/270,320, Preliminary Amendment filed Feb. 15, 2006.
U.S. Appl. No. 11/270,320, Response mailed Jul. 22, 2008 to Office Action dated May 30, 2008.
U.S. Appl. No. 11/270,320, Response mailed Dec. 30, 2008 to Office Action dated Nov. 5, 2008.
U.S. Appl. No. 11/270,320, Response mailed Apr. 27, 2009 to Office Action dated Jan. 27, 2009.
U.S. Appl. No. 11/270,320, Response mailed Sep. 9, 2009 to Office Action dated Jul. 9, 2009.
U.S. Appl. No. 11/270,320, Response mailed Jan. 4, 2010 to Advisory Action dated Sep. 21, 2009.
U.S. Appl. No. 11/270,320, Office Action dated Feb. 22, 2010.
U.S. Appl. No. 11/270,320, Response mailed May 21, 2010 to Office Action dated Feb. 22, 2010.
U.S. Appl. No. 11/270,320, Office Action dated Jun. 8, 2010.
U.S. Appl. No. 11/270,320, Response mailed Aug. 9, 2010 to Office Action dated Jun. 8, 2010.
U.S. Appl. No. 11/270,320, Advisory Action dated Aug. 26, 2010.
U.S. Appl. No. 11/270,320, Notice of Appeal dated Oct. 8, 2010.
U.S. Appl. No. 11/270,320, Appeal Brief filed Dec. 8, 2010.
U.S. Appl. No. 11/270,320, Notification of Non-Compliant Appeal Brief dated Nov. 17, 2010.
U.S. Appl. No. 11/270,320, Corrected Appeal Brief filed Jan. 18, 2011.
U.S. Appl. No. 11/270,320, Examiner's Answer dated Mar. 30, 2011.
U.S. Appl. No. 11/270,320, Reply Brief filed May 31, 2011.
U.S. Appl. No. 11/270,320, Appeal Docketing Notice dated Jun. 21, 2011.

* cited by examiner

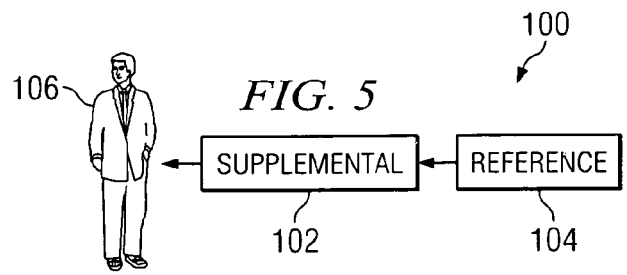
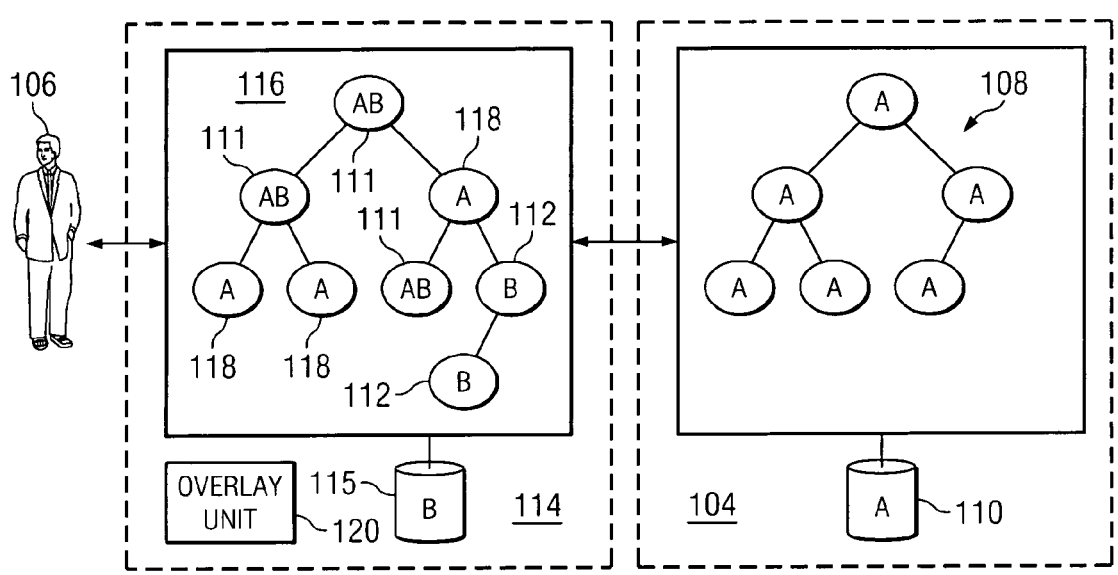
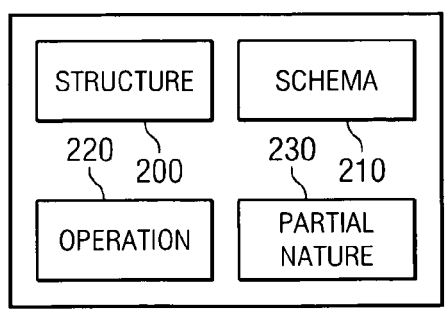

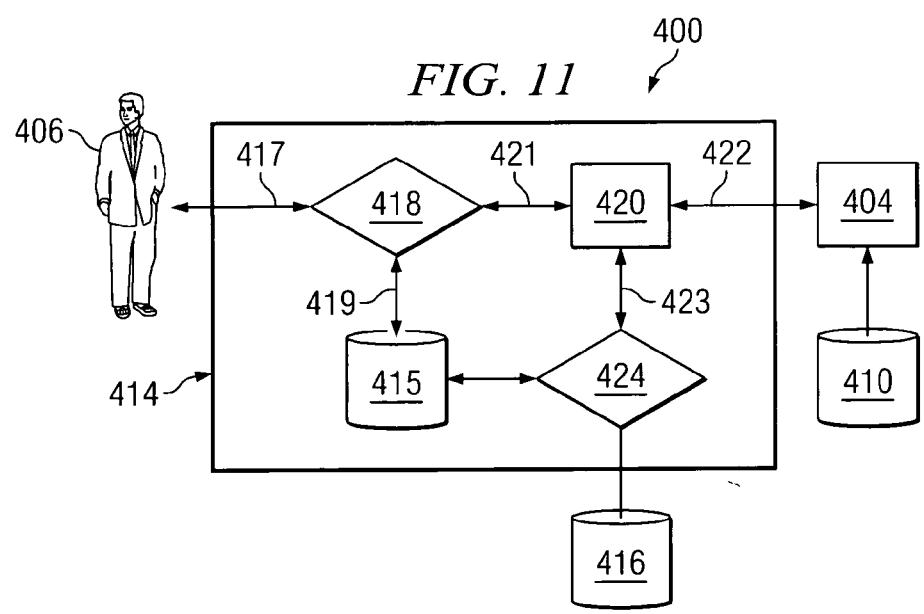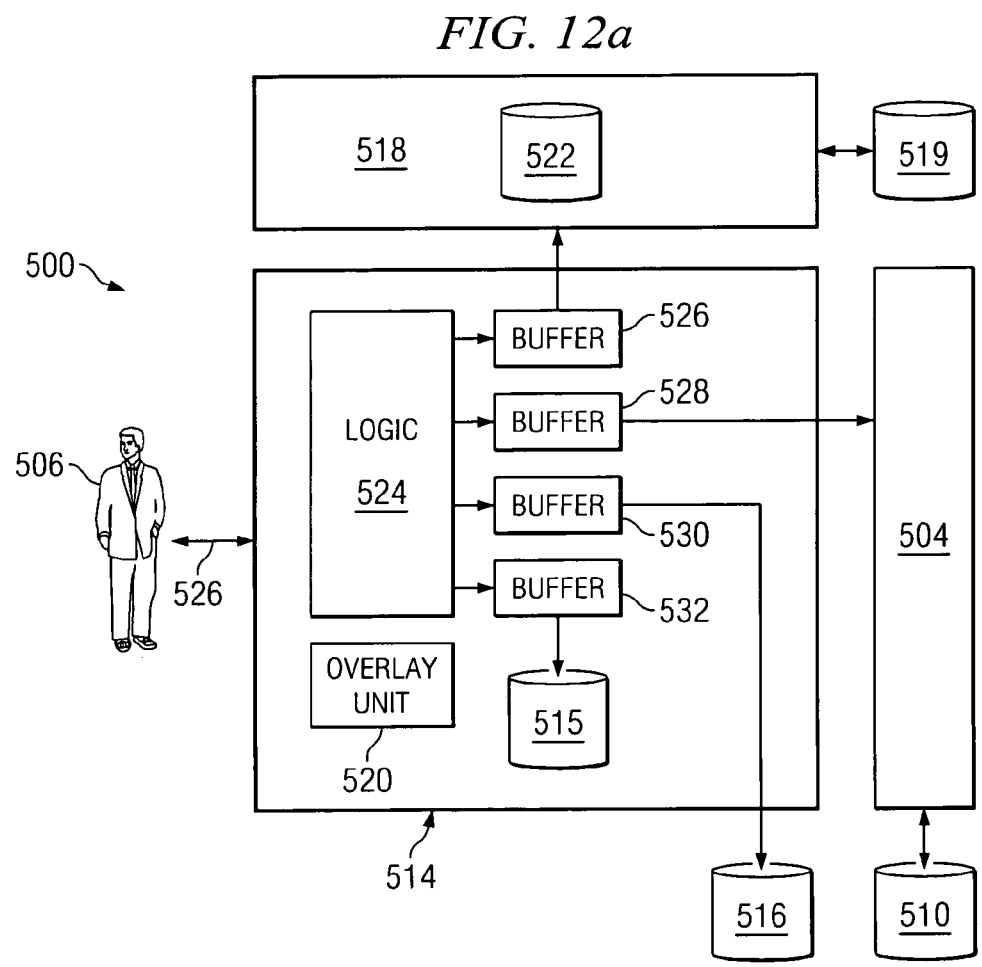

# METHOD AND SYSTEM FOR PROVIDING A DIRECTORY OVERLAY

CROSS-REFERENCE

This application is being filed concurrently with the following applications, which are incorporated herein by reference: "Method and System for Configuring a Supplemental Directory," having a serial number of Ser. No. 11/270,794; "Method and System for Providing Enhanced Read Performance for a Supplemental Directory," having a serial number of Ser. No. 11/270,795; "Method and System for Improving Write Performance in a Supplemental Directory," having a serial number of Ser. No. 11/270,896; "Method and System for Automatic Registration of Attribute Types," having a serial number of Ser. No. 11/270,320; "System and Method for Routing Directory Service Operations in a Directory Service Network," having a serial number of Ser. No. 11/269,551; "System and Method for Efficient Directory Performance Using Non-Persistent Storage," having a serial number of Ser. No. 11/269,637; "System and Method for Providing a Directory Service Network," having a serial number of Ser. No. 11/269,638; and "System and Method for Writing Data to a Directory," having a serial number of Ser. No. 11/270,188.

TECHNICAL FIELD OF THE INVENTION

This invention relates generally to directory services and more particularly to a method and system for providing a directory overlay.

BACKGROUND OF THE INVENTION

In today's networked environment there are many instances of directories used for many different purposes. Example directories include Network Operating System Directories such as for managing logins, file-systems, and printers; Security Directories such as for single sign-on, web access management, and service management; application specific directories, such as online telephone directories, location directories, and email directories; and publishing directories, such as white pages, yellow pages, and blue pages.

In practice, many directories operate in isolation from each other, resulting in problems. One such problem is duplication of data, which may result in inconsistencies between servers depending on how the data is updated. Another problem is fragmentation of data, which results when different systems store data in different ways. Another problem is that management and administration of separate systems can be tedious and duplicated. Further, there can be problems with privileges and enforcing organizational wide policies between systems. With respect to standards, vendors have proprietary systems with many proprietary extensions and vendors are not obligated to adopt a common standard. In addition, sharing of databases or their customization is difficult; one operations group may "own" a particular directory and will not allow it to be used, written to, or extended by another group or other applications.

SUMMARY

According to one embodiment, a method for providing an enhanced directory service includes providing a supplemental layer between a user and a reference layer, the supplemental layer providing the user with any directory functionality provided by the reference layer as well as additional directory functionality.

Embodiments of the invention may provide numerous technical advantages. Some, none, or all embodiments may benefit from the below described advantages. According to one embodiment, a supplemental directory service may make a directory that is read-only appear writable to a user. Further, in some embodiments, a directory that has a fixed or limited directory information tree (DIT) can appear to have an extensible one. Further, in some embodiments a directory with a fixed schema can appear to have its schema extendable to a user. In some embodiments, a directory that has security restrictions can appear to have a supplemented security to a user. Also, in some embodiments, a directory that does not have replicating capability can appear to replicate to another directory. Moreover, in some embodiments, a directory that has limited replication capability can appear to have enhanced replication capability. Also, a directory that is relatively slow can appear to perform much better, in some embodiments.

In addition, in some embodiments, a directory having certain policies can appear to have altered or enhanced policies, such as altered or enhanced administration limits. In some embodiments, a directory with certain associations can appear to have altered or enhanced network associations, for example trust or knowledge of other servers. In some embodiments, a directory without certain features or capabilities can appear to support new features or capabilities, such as the capability to count entries, having non-persistent attributes, and the capability to automatically register attributes. Further, in some embodiments, a directory configured with one or more context prefixes can appear to have different context prefixes.

Other technical advantages will be apparent to one of skill in the art.

BRIEF DESCRIPTION OF THE FIGURES

For a more complete understanding of the present invention and its advantages, reference is now made to the following description, taken in conjunction with the accompanying drawings, in which:

FIG. 5 is a block diagram of a directory system according to one embodiment of the invention;

FIG. 6 is a block diagram showing a particular embodiment of the directory system of FIG. 5;

FIG. 7 is a block diagram illustrating the aspects of client view directory;

FIG. 8 is a flowchart illustrating operation of one embodiment of directory system 100;

FIG. 11 is a block diagram illustrating an alternative embodiment;

FIG. 12A is a block diagram illustrating a directory system 500 according to the teachings of yet another embodiment;

DETAILED DESCRIPTION OF EXAMPLE EMBODIMENTS

Embodiments of the present invention and its advantages are best illustrated by referring to FIGS. 1-15B of the drawings, like numerals being used for like parts of the various drawings.

The teachings of some embodiments of the invention recognize that the above-described difficulties in sharing and customization in directories is particularly significant. Many organizations have corporate directory systems for staff, networking, and other purposes. These directory systems are usually controlled by an MIS or GIS group. However, many types of applications would like to extend these directories for their own use. For example, a single-sign-on application may wish to add session data to each person's staff object. Usually this is not possible because the MIS/GIS groups often do not make their directory visible to applications, make them visible but only read-only, or may allow reading and writing of only a fixed set of information, but not for new types of data. There have been three main approaches to the many directories problems described above. These are partitioning, meta directories, and virtual directories.

Figure 1:
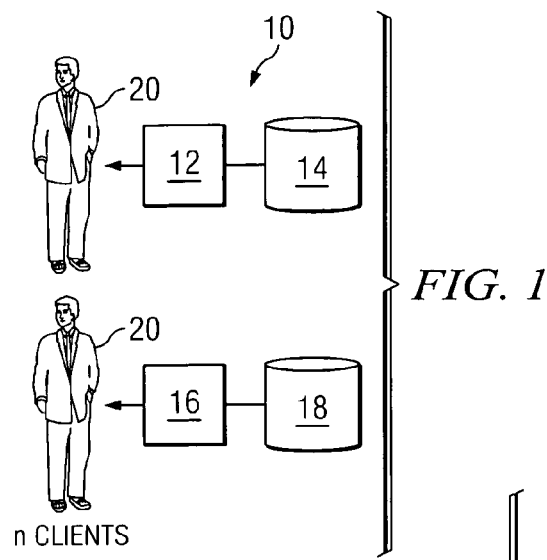
FIG. 1 is a block diagram showing an example of partitioning.
Figure 2:
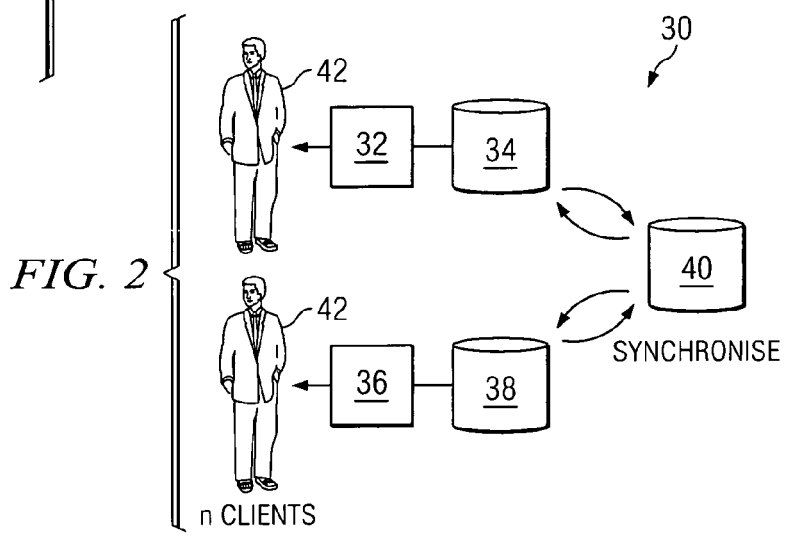
FIG. 2 is a block diagram showing an example use of meta directories.

Partitioning involves an attempt by design, to avoid duplication by separating information amongst separate directories. FIG. 1 is a block diagram showing an example of partitioning. In this case a directory system 10 is shown having two directories, directory 12 and a corresponding data store 14, and another directory 16 and a corresponding data store 18. Information in directories 12 and 16 is provided separately to a client 20 who must connect separately to each directory in order to access desired information. For example, directory 12 may be a Network Operating System (NOS) directory managing staff, file-systems, printers, logins, and other devices or files while directory 16 may contain application information such as customers, billing information, and subscribed services. This works poorly if the directories 12 and 16 must contain related information and/or require that client 20 understands which directories 12, 16 maintain which information.

Meta directories involve a synchronization mechanism whereby an independent store of information is maintained and information is periodically imported and exported with external directories. An example is shown FIG. 2, which is a block diagram showing an example use of meta directories. In this case a directory system 30 is shown having a first directory 32 with corresponding data store 34 and a second directory 36 with a corresponding data store 38 and a meta directory 40. This approach suffers from the problem of scaling poorly because meta directory 40 must keep a copy of all data to be synchronized across all directories 32 and 36 and does not handle real time updates well. For example, clients 42 may obtain different results depending on from which directory 32, 36 they request shared information. This is due primarily to synchronization delays.

Figure 3:
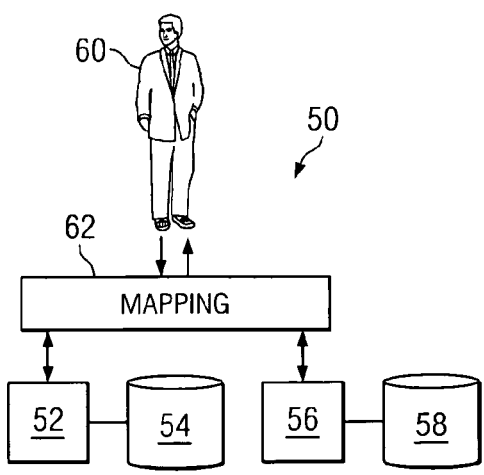
FIG. 3 is a block diagram showing an example of a virtual directory system.

Virtual directories utilize a mapping mechanism whereby queries are disassembled and results re-assembled across several directories. FIG. 3 is a block diagram showing an example of a virtual directory system 50. In this case there is a first directory 52 with a corresponding data store 54, a second directory 56 with a corresponding data store 58, and intermediate a client 60 there is a virtual directory 62. Virtual directory 62 provides a view of data in underlying directories 52 and 56 by retrieving the data and mapping and combining the data into a single synthesized view. For example, if the underlying directory 52 or 56 has data arranged by organization, virtual directory 62 can re-assemble the data to appear as if it were arranged by location. However, teachings of some embodiments of the invention recognize that virtual directory 62 has the limitation that it does not store supplemental data (user data which augments the underlying directories). Thus, all mapping is done dynamically. Virtual directory 62 also has problems handling updates because there can be a many-to-many relationship between the synthesized view and the real data, which results in a single update to an entry in virtual directory 62 requires a large number of changes in the real underlying directory 52 or 56.

Figure 4:
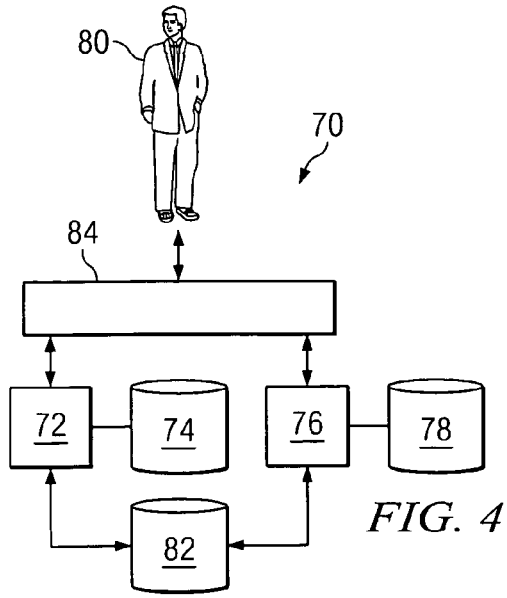
FIG. 4 is a block diagram illustrating an example of the combination of the approaches of FIGS. 1 through 3.

It is also possible to combine any or all of the above approaches. FIG. 4 is a block diagram illustrating an example of the combination of the above approaches. In this case, combination directory system 70 includes a first directory 72 with a corresponding data store 74 and a second directory 76 with a corresponding data store 78 and a client 80. Directories 72 and 76 are synchronized by a meta directory 82 and client 80 can view the directory data via a virtual directory 84. In practice, this arrangement suffers from the same problems as those described above in conjunction with FIGS. 1, 2 and 3.

Certain embodiments of the present invention address the above-described problems and can provide directory operations in the case where there are restrictions on an existing directory server. FIG. 5 is a block diagram of a directory system 100 according to one embodiment of the invention. As illustrated in FIG. 5, a supplemental layer 102 is provided intermediate a reference layer, or in this case a reference directory 104, and a client 106. According to one embodiment, intermediate layer 102, or overlay, is utilized to supplement reference directory 104 by managing extra data, managing extra data types, managing extra security, and/or other functions. To user 106, overlay 102 may be transparent, but overlay 102 makes it look like underlying reference directory 104 is being interrogated and manipulated. As described in greater detail below, user 106 can be a person, an application or another directory.

Thus, according to the teachings of some embodiments of the invention, the ability to supplement a reference directory 104 is provided. This may be necessary when there are restrictions on the reference directory 104.

In operation of one embodiment, overlay 102 handles all queries and updates, handles the storage and retrieval of extra data, and interacts with reference directory 104 as if all of that data was local to overlay 102; however, in some embodiments, overlay 102 may handle only some of the queries and updates. In contrast, some prior approaches for handling a restriction on reference directory 104 involve copying all the information from reference directory 104 into another directory and then having mechanisms to keep the directories synchronized. This can be a lengthy process and has many drawbacks, including attribute synchronization issues. Overlay 102 works alongside reference directory 104, one example of which is Microsoft Active Directory. This provides a supplemented view of all the information combined from reference directory 104 overlaid with information from overlay 102. Such supplemental information may reside in a supplemental store, as described in greater detail below in conjunction with FIG. 6. According to one embodiment, overlay 102 is not co-located with reference directory 104, which means it may be on a separate machines. According to another embodiment the overly 102 may hide from the user information contained in the reference directory 104. This combining of information in real-time may alleviate the need for data synchronization as well as provides extensibility, flexibility and/or added performance.

Reference directory 104 is a directory server that services client operations, in one embodiment. The information in reference directory 104 may be stored in a reference store, as described in greater detail below in conjunction with FIG. 6. In addition to the information stored in the reference store, reference directory 104 may include conventional or yet-to-be developed functionality for interacting with user 106 or with another directory.

User 106, which is also referred to herein as, and may take the form of, a client or application, is an entity that makes a directory request. User 106 may be a person, an application, or another directory, and any user may include other directory servers.

As described above, in some, but not necessarily all embodiments, advantages include, in general, where directory 104 has certain features or performance characteristics or is lacking certain features or performance characteristics, overlay 102 can, in effect, provide an altered or supplemented feature and performance characteristic set to that directory. Additional details of example embodiments are described below.

FIG. 6 is a block diagram showing a particular embodiment of directory system 100, showing a supplemental directory 114 in combination with reference directory 104, and in particular, showing supplementing of attributes and entries. In this particular embodiment, overlay, or supplemental layer 102, takes the form of a supplemental directory 114. However, in other embodiments overlay 102 may take forms other than a supplemental directory, such as any other software implementing the overlay functionality.

Attributes A are stored in reference directory 104 in entries. Reference directory 104 has a reference store 110. Reference store 110 represents the information stored in reference directory 104. One example of a reference store 104 is Microsoft Active Directory. Attributes B and additional entries 112 are stored in supplemental directory 114 having a supplemental store 115. Supplemental store 115 represents the supplemental information stored in supplemental directory 114. It is noted that supplemental store 115 may be empty and need not conform to any directory rules, in one embodiment. For example, supplemental store 116 may contain partial entries and entries with no parent. Supplemental directory 114 includes an overlay unit 120, described in greater detail below.

Supplemental directory 114 presents a client view 116. In the case of attributes, client 106 will see reference directory 104 having attributes A supplemented with the supplemental directory 114 having attributes B. This results in entries 111 having attributes A and B while other entries 118 retain the structure and attributes of the reference directory 104.

In the case of entries, client 106 will see reference directory 104 having entries 108 supplemented with the supplemental directory 114. This results in additional entries 112 that are not present in reference directory 104. The additional entries 112 have structure and attributes as provided by supplemental store 116.

It should also be noted that the supplemental directory 114 can also "mask out" information, the effect being that the user may not be able to see (retrieve or search) attributes and/or entries in the reference directory 104.

Four main aspects of client view directory 116 are described below with reference to FIG. 7. FIG. 7 is a block diagram illustrating aspects of client view directory 118. These aspects are client view directory structure 200, client view directory schema 210, operation 220 of the client view directory, and the partial nature 230 of client view directory 116.

Client view directory structure 200 is the hierarchical shape of client view directory 116. In one embodiment, supplemental directory 114 has the same context prefix and structure of reference directory 104. In other embodiments, supplemental directory 114 overlies all or part of one or more reference directories 104 and/or supplemental directories 114. This means the view is made up of smaller subtrees each being grafted into the general view, possibly using prefix mapping (see below). Thus the view or DIT (Directory Information Tree) seen by the user is made up of one or more views/DITs from one or more reference directories. Supplemental directory 114 could also have more than one prefix, which could be superior or subordinate to reference directory 104.

In one embodiment, the content of supplemental directory 114 is that of reference directory 104; however, supplemental directory 114 can also supplement reference directory 104 by having extra attributes in any of the entries, such as entries 111. In one embodiment, the structure of supplemental directory 114 is that of reference directory 104; however, supplemental directory 114 can also supplement reference directory 104 by having extra entries. Supplemental directory 114 may not have a Directory Information Tree initially unless preloaded. A Directory Information Tree (DIT) defines the hierarchy of information in a directory. In contrast, a Directory Information Base (DIB) refers to the information stored in a particular directory server. It is also noted that a Directory System Agent (DSA) refers to the directory process looking after all or part of the DIT or routing or relaying of requests. Further, as used herein "internal attributes" refers to attributes contained in supplemental store 115 (or other portions of supplemental directory 114), and "external attributes" refers to attributes contained in reference store 110 (or other portions of reference directory 104). Likewise, "internal object classes" refers to object classes contained in supplemental store 115 (or other portions of supplemental directory 114) and "external object classes" refers to object classes contained in reference store 110 (or other portions of reference directory 104).

In one embodiment, renaming reference entries directly will orphan supplemental entries. However the supplemental directory 104 may prune and graft its supplemental entries, such as entries 112, to maintain the structure.

Client view directory schema 210 comprises the attribute types that the client view directory 116 appears to support. In one embodiment, attributes will either be internal or external. An internal attribute refers to an attribute stored in supplemental store 115, and an external attribute refers to an attribute stored in reference store 110. In some embodiments, the attributes may be copied between reference store 110 and supplemental store 116, for example to name an entry. A duplicate attribute may also be utilized in some embodiments, in which case the supplemental value will replace the reference value. The supplemental schema of supplemental directory 114 may implicitly contain the reference stores schema as a subset. In one embodiment, supplemental directory 114 will dynamically discover the schema of reference directory 104 so that it does not have to be preconfigured.

The behavior of the client view directory 114 is referred to herein as operations 220. If no internal attributes exist in supplemental directory 114, supplemental directory 114 may proxy the reference directory 104. For example, reading an entry will simply chain the request and response to or from the reference directory. Supplemental directory 114 may mask out or replace attributes and/or entries of reference directory 104. For any given operation, supplemental directory 114 may need to break the operation up into many operations, with none or more which are done locally on the supplemental directory 114 and the remaining done on the reference directory 104.

In one embodiment, when supplemental directory 114 supplements information from reference directory 104 it does so on the basis that the information is uniquely identifiable, for example, based on the Distinguished Name of the entry associated with the supplement information. In one embodiment, reference store 110 handles its own replication. However, it is also possible to duplicate the writes to replicate reference directories 104 if desired. Supplemental directory 114 may have permissions in reference directory 104. This can be achieved via a proxy user, the credentials passed through from user 106, or through other suitable techniques.

The partial nature 230 of client view directory 116 is described herein. In one embodiment, supplemental directory 114 will overlay a single reference directory 104 that has no subordinate directories (as shown in FIG. 6). However, in other embodiments, supplemental directory 114 may chain or multi-chain operations to subordinates directories. Apart from structure, supplemental directory 114 may be independent of reference directory 104. Supplemental store 116 may not be subject to normal schema rules. For example, entries need not have parents, entries can be partial, entries can exist without object classes or mandatory attributes, etc. However, in one embodiment, supplemental directory 114, which services user operations by supplementing reference directory 104, will appear to obey all directory rules, such as schema. In one embodiment, supplemental directory 114 may internally use glue DSE (Directory System Entries) entries, for example to represent an object in the reference directory 104. Glue DSE entries allow entries to be added to a directory without parent nodes existing. The present nodes are stored as name only, with no object classes or attributes, and this cannot usually be searched.

Operation of overlay unit 120 within the supplemental directory 114 is described in greater detail below with reference to FIG. 8. FIG. 8 is a flowchart illustrating operation of one embodiment of directory system 100. The steps shown in FIG. 8 may be executed by, or in cooperation with, overlay unit 120, or through other suitable techniques. Overlay unit 110 may comprise software encoded in computer-readable medium, firmware, or other suitable structure operable to perform desired operations of overlay unit 120. Although illustrated as a flowchart for simplicity of description, these steps may occur in a different order and any of these may be omitted.

In a system containing a plurality of directories, such as system 100, it is desirable to nominate at least one directory to be the supplemental directory 114, and it is desirable to mark at least one directory to be the reference directory 104. The supplemental or the reference directory can be marked using a configuration setting, as illustrated at step 244.

Preferably, a reference directory, such as reference directory 104, is to be associated with a supplemental directory, such as supplemental directory 114. Alternatively, more than one supplemental directory can be associated with one reference directory. Furthermore, a single supplemental directory can be associated with more than one reference directory. The associations can be defined by configuration settings. An example of configuration settings is shown below.

EXAMPLE 1

```
set dsa REF =
{
    prefix = <o CA><ou Staff>
    native-prefix = <dc local><dc ca>
    dsa-name = <cn "staff-reference">
    ldap-dsa-name = <dc local><dc ca><cn users><cn administrator>
    ldap-dsa-password = "ad-password"
    address = tcp "msad" port 389
    dsa-flags = overlay-reference
    trust-flags = no-server-credentials, allow-check-password
    link-flags = dsp-ldap
};
set dsa OVERLAY =
{
    prefix              = <o CA><ou Staff>
    dsa-name            = <c AU><cn overlay>
    dsa-password        = "secret"
    address             = tcp "echidna" port 30000
    disp-psap           = DISP
    snmp-port           = 30000
    console-port        = 30001
    ssld-port           = 1112
    auth-levels         = anonymous, clear-password
    dsa-flags           = multi-write, overlay
    trust-flags = allow-check-password, trust-conveyed-originator
};
```

From the above it can be seen that reference directory 104 is marked with the flag "overlay-reference." Also, supplemental directory 114 is marked with the flag "overlay." The reference and supplemental directories are associated by virtue of having the same prefix. Note in this example, reference directory 104 has its own prefix, but this is prefixed mapped by supplemental directory 114. It is noted that directory system 100 can contain directories which are neither reference nor supplemental directories.

At step 246 initialization occurs. During initiation, overlay unit 110 determines which information is internal, that is the attributes types and object classes maintained by supplemental store 116 and which information is external, that is, the attributes types and object classes maintained by the reference directory 104. In one embodiment the internal and external attributes and object classes can be defined in the configuration. In another embodiment, the external attributes and object classes can be discovered by connecting to reference directory 104 and reading its schema. Initialization 206 completes when reference directory 114 is available.

At this point directory system 100 is ready for use, and client 106 may interact with it, as indicated at step 248. Additional details of this client interaction are described with respect to FIG. 9.

Supplemental directory 114 may replicate its information to another directory if configured to do so, as indicated by step 250. The replication may include any or a combination of supplemental information, reference information, or selected information.

There are some situations where it might be advantageous to perform operations ignoring the reference directory 104, for example to replace an attribute in reference directory 104 or to assist in the discovery and maintenance of orphan entries, as indicated at step 252. To do this, a client 106 may pass a special bypass control. For example, to discover orphan entries, an application could retrieve supplemental entries, such as entries 112, (with bypass control present) and perform a base object search (no bypass control) for each entry retrieved—any base object searches failing with 'no-such-object' indicate orphan entries. Orphans could be maintained via updates with bypass control present.

An example control "overlayreferenceBypassControl" could be defined as follows:
Description: "This control MAY be sent with any LDAP request message in order to convey to the server that the request should be serviced by the overlay only and NOT the reference."
controlType: 1.3.6.1.4.1.3327.23.1
criticality: TRUE
controlValue: None The method of FIG. 8 concludes at step 254.

Figure 9:
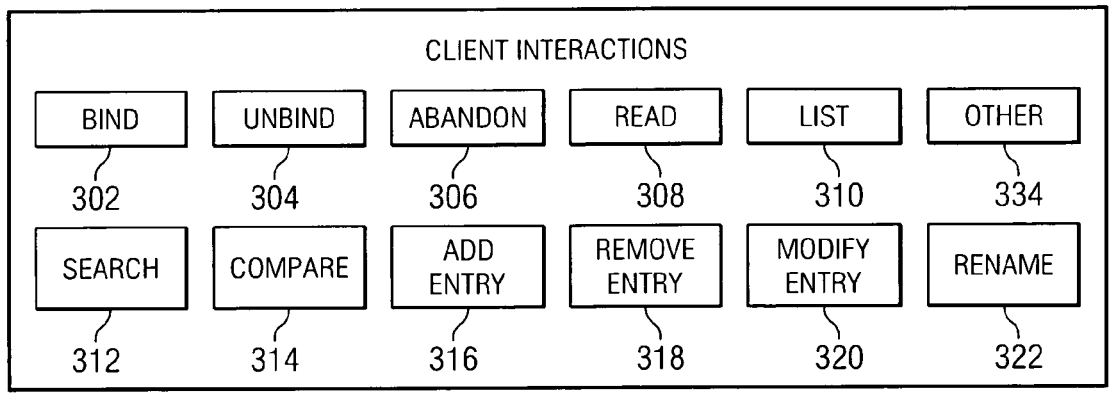
FIG. 9 is a block diagram illustrating a plurality of example client interactions.

FIG. 9 is a block diagram illustrating a plurality of example client interactions, each of which are described in greater detail below. These example client interactions include bind 302, unbind 304, abandon 306, read 308, list 310, search 312, compare 314, add-entry 316, remove entry 318, modify entry 320, and rename 322. These interactions may be performed through overlay unit 110, or through other suitable techniques. It is emphasized that these example client interactions are described in detail below to teach and enable one of skill in the art to make and use the invention, but that the claims are not intended to be limited by these specific example client interactions.

After initiation, reference directory 104 is available, and client 106 may attempt to access, or bind 302, to supplemental directory 114. When client 106 binds to supplemental directory 114, the supplemental directory 114 will attempt to authenticate client 106 locally. If overlay unit 120 does not have enough information, for example not having a UserPassword attribute, the bind request is passed to reference directory 104 in response to which a bind confirm or bind refused is returned. In the case of a DSP (Directory System Protocol) bind from another directory, then configured credentials may be used, for example ldap-dsa-name, ldap-dsa-password, as shown in the example above.

When a client unbinds 304 from supplemental directory 114, supplemental directory 114 may optionally unbind from the reference directory.

When a client abandons 306 an operation sent to supplemental directory 114, supplemental directory 114 may optionally send an abandon 306 to reference directory 104.

Read 308 may occur in a similar manner to a search with no filter, as described in greater detail below.

List 310 may occur in a similar manner to a one-level search with no filter, as described in greater detail below.

On receipt of a search request 312 the attributes contained in the search request are checked by overlay unit 110. Different actions are taken depending on the type of search. These actions are described in greater detail below in conjunction with FIG. 10.

On receipt of a compare request 314 by overlay unit 120, the assertion attribute will be checked. If the assertion attribute is external, the compare is performed against reference directory 104, otherwise the compare is performed locally against supplemental directory 114. The results are then returned to client 106.

An add-entry operation 316 may be classed as internal, external or both. An internal add-entry is the case where add-entry operation 332 only includes internal attributes and internal object classes. In this case the external parent may be checked. If it is not internal, then the add-entry is performed against reference directory 114 (providing it is not marked 'read-only') and any internal attributes stripped. If the Add was successful and internal attributes exist, a local add-entry containing these internal attributes will be performed. The results are then returned to client 106.

Entry removal 318 will be performed against both reference store 110 (if not marked 'read-only') and locally on supplemental store 116. If unable to remove from reference store 110, an error is returned without doing the remove locally on supplemental store 116.

On receipt of a modify-entry request 320 the attributes will be checked by the overlay unit 120 to determine if they are internal or external, or if the modify-entry request 320 contains both. A modify-entry operation 320 containing external attributes only can be passed straight to reference directory 104 (if not marked 'read-only') without any local processing. A modify-entry 320 of internal attributes only is performed locally on supplemental directory 114 if the entry exists in reference directory 104. If the entry does not exist locally, it is created. For, a modify-entry 320 containing a mixture of internal and external attributes, the modify will be rejected if reference directory 104 is marked 'read-only'. The mixed attribute modify will be split into a reference modify-entry containing the external attributes and a supplemental directory modify containing the internal attributes. The reference modify-entry will be performed first. The success of this will indicate to the internal modify-entry that an entry already exists and the local modify-entry can proceed.

A modify DN request 332, which stands for renaming a directory, will be forwarded to reference directory 104 (if not marked 'read-only'). If successful the request is performed locally on supplemental store 116.

Other client interaction block 334 is also illustrated in FIG. 9. Client interactions other than the example interactions described above may be handled in a manner analogous to those described above or may be handled as otherwise appropriate according to the skill of one in the art.

Figure 10:
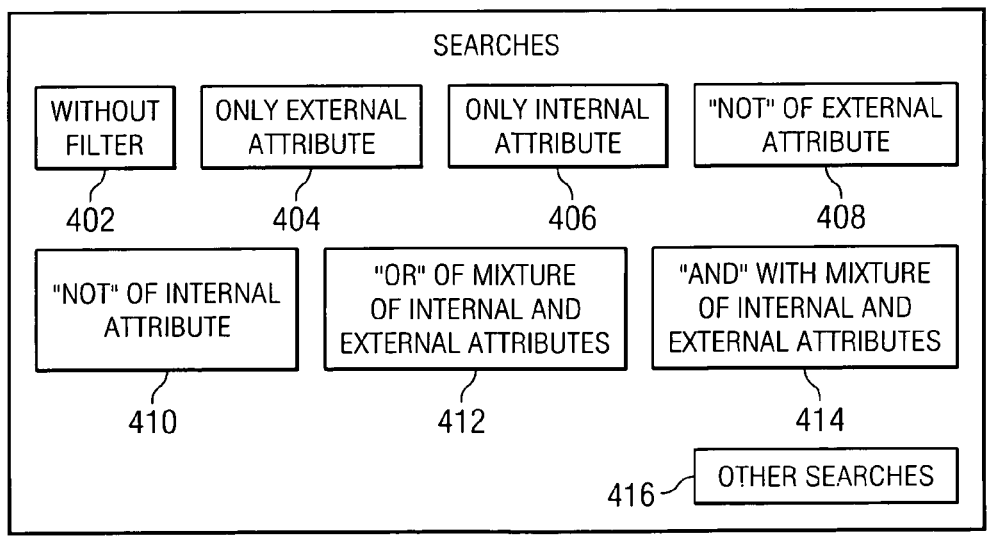
FIG. 10 is a block diagram illustrating a plurality of example searches 312.

FIG. 10 is a block diagram illustrating a plurality of example searches 312. Searches without filters 402 may be performed against reference directory 104 and internally against supplemental directory 114 with the results being merged. Searches with a filter containing only external attributes 404 may be performed against reference directory 104. For each entry returned, a local base object search is performed on supplemental directory 114 and the attributes returned supplemented into the entry.

Searches with a filter containing only internal attributes 406 may be performed locally at supplemental directory 114. For each entry returned a reference base object search is performed on reference directory 104 and the attributes returned supplemented into the entry.

Searches with a filter containing a "NOT" of an external attribute 408 may be performed against reference directory 104. For each entry returned, a local base object search is performed on the supplemental directory 114 and the attributes returned supplemented.

Searches with a filter containing a NOT of an internal attribute 410 will be performed locally on supplemental directory 114. For each entry returned a reference base object search is performed on reference directory 104 and the attributes returned supplemented into the entry.

Searches containing an OR filter with a mixture of internal and external attributes 412 may be split into two searches. For each reference directory 104 entry returned, a local base object search is performed on reference directory 104 to retrieve the entry's internal attributes. For each supplemental directory 114 entry returned, a base object search is performed against reference directory 104 to retrieve the entry's external attributes. The combined results are returned to client 106.

Searches containing an AND filter with a mixture of internal and external attributes 414 may be split into two searches, one local on supplemental directory 114 and one on reference directory 104 and the common set of entries determined. For each common entry, both a local base object search and a base object search is performed against reference directory 104 to retrieve all the common entry's attributes.

Searches containing any combination of ANDs, ORs or NOTs can be evaluated using a combination of the above individual techniques. For example, a complex filter expression can be expanded using Boolean algebra into a disjunctive normal form, from which the NOT then AND then OR techniques can be applied, though not necessarily in that order.

Other searches block 416 is also illustrated in FIG. 10. Searches other than the example searches described above may be handled in a manner analogous to those described above or may be handled as otherwise appropriate according to the skill of one in the art.

Any search performed against reference directory 104 that results in an error (including base-object searches retrieving attributes) may result in an error being sent to client 106. Any internal errors in the supplemental directory 114 except 'no-such-object' may be sent to client 106.

FIG. 11 is a block diagram illustrating an alternative embodiment, showing a directory system 400. Directory system 400 includes a reference directory 404 as well as a supplemental directory 414, similar to the supplemental directory and reference directory described above. Further, system 400 includes a persistent information store 410 associated with reference directory 404. However, in this embodiment, supplemental directory 414 includes a non-persistent information store 415. Non-persistent information store 415 may be an alternate evaluator as disclosed in corresponding applications which are incorporated herein by reference: "Method and Apparatus for Enhancing Directory Performance," having a serial number of Ser. No. 11/134,047, filed May 5, 2005; "Method and Apparatus of Optimising Directory Performance," having a serial number of Ser. No. 11/134,143, filed May 20, 2005; "Method and Apparatus for Handling Directory Operations," having a serial number of Ser. No. 11/134,251, filed May 20, 2005; "Method and Apparatus for Loading Data into an Alternate Evaluator for Directory Operations," having a serial number of Ser. No. 11/134,043, filed May 20, 2005; "Structure of an Alternate Evaluator for Directory Operations," having a serial number of Ser. No. 11/134,237, filed May 20, 2005; "Method of Selecting a Processor for Query Evaluation," having a serial number of Ser. No. 11/134,070, filed May 20, 2005; "Dynamic Management of Indexes for an Alternate Evaluator," having a serial number of Ser. No. 60/722,729, filed Sept. 30, 2005; "Dynamic Creation of Indexes for an Alternate Evaluator," having a serial number of Ser. No. 60/722,917, filed Sept. 30, 2005; or a directory as disclosed in "System and Method for Routing Directory Service Operations in a Directory Service Network," having a serial number of Ser. No. 11/269,551; "System and Method for Efficient Directory Performance Using Non-Persistent Storage," having a serial number of Ser. No. 11/269,637; "System and Method for Providing a Directory Service Network," having a serial number of Ser. No. 11/269,638; and "System and Method for Writing Data to a Directory," having a serial number of Ser. No. 11/270,188, which are incorporated herein by reference. In addition, a persistent information store 416 is associated with supplemental directory 414.

In operation, a query 417, for example a read, list, search, compare, bind, or other query is analyzed at step 418 to determine whether the query can be wholly performed with reference to non-persistent information store 415. This determination may be in accordance with "Method of Selecting a Processor for Query Evaluation," having a Ser. No. 11/134,070, filed May 20, 2005, which is incorporated herein by reference. If the query can be wholly performed with reference to non-persistent information store 415, then query 417 is directed to non-persistent information store 415, as indicated by reference numeral 419, and the result is returned to client 13. Otherwise, query 417 is directed to overlay unit 420, which may be analogous to overlay unit 120, as indicated by reference numeral 421. Query 417 may alternatively be forwarded directly to overlay unit 420.

When query 417 is directed to overlay unit 420, overlay unit 420 may perform a number of operations, zero or more of which may be directed to reference directory 404 as indicated by reference numeral 422 and/or zero or more of which may be directed locally. The operations that are directed locally to reference directory 404 are evaluated by reference directory 404 and the result is returned to overlay unit 420.

For operations that are directed locally, as indicated by reference numeral 423, further determination 424 is made as to whether the query can be evaluated by the non-persistent information store 415 or persistent information store 416. This determination may be made in accordance with U.S. Ser. No. 11/134,670, described above. In one embodiment, preference is given to non-persistent information store 415, which results in greater speed. The operations that are directed locally are evaluated by either non-persistent information store 415 or persistent store 416. In the case where there is no persistent information store 416, the operations directed locally, as indicated by reference numeral 423, are evaluated by non-persistent information store 415. After local evaluation, a result is returned to overlay unit 420.

When the operations performed by overlay unit 420 are completed, a result is returned to user 406.

FIG. 12A is a block diagram illustrating a directory system 500 according to the teachings of yet another embodiment. Directory system 500 includes a supplemental directory 514 and a reference directory 504. Also illustrated in directory system 500 is a persistent information store 510 associated with reference directory 504 and a non-persistent information store 515 associated with supplemental directory 514. Supplemental directory 514 also has a persistent information store 516 associated with it. In a particular embodiment, a peer directory 518 is associated with supplemental directory 514. Peer directory 518 may have either or both of a non-persistent information store 522 or a persistent information store 520 associated with it.

Supplemental directory 514 includes logic 524 and buffers 526, 528, 530, and 532. Alternatively, logic 524 may be included in overlay unit 520.

Figure 12B:
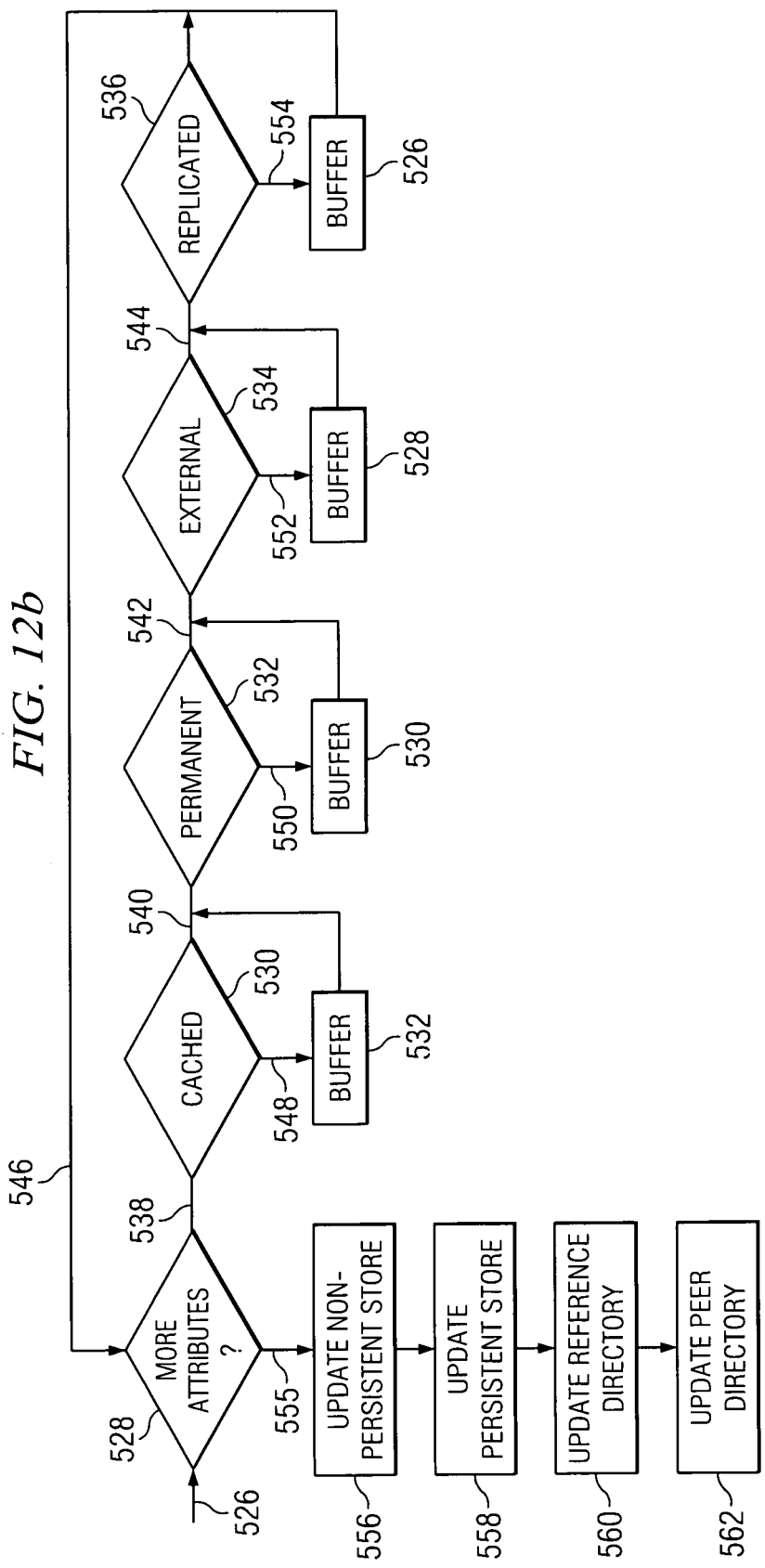
FIG. 12B is a flowchart illustrating processing of an update 526 received by logic 524 from client 506.

In operation, an update 526 is received from client 506 by logic 524, and is processed with reference to FIG. 12B. FIG. 12B is a flowchart illustrating processing of an update 526 received by logic 524 from client 506. The steps of the flowchart of FIG. 12B may be performed by logic 524, or other suitable device. Update 526 is a directory update operation, such as add-entry, remove-entry, modify-entry, modify-DN, or remove-entry. A test 528 checks for any attributes not yet processed. If there are attributes to be tested, path 538 is followed and the attribute is tested repeatedly, for example at test 530, test 532, test 534, and test 536. The number of order of tests may vary as required, dependent on the particular implementation.

In this embodiment, test 530 checks to determine whether the attribute needs to be cached. This includes cases where the attribute is temporary, persistent, or cached. Where the attribute is temporary, the supplemental attribute is store only in non-persistent store 515. Where the attribute is persistent, the supplemental attribute is store in at least non-persistent stores 515 and 522, and optionally further additional peer directories. Where the attribute is cached, this indicates it is an external attribute of reference directory 504, which is configured to be stored in non-persistent store 510. If the attribute is to be cached, it is forwarded to buffer 532 as indicated by reference numeral 548. In any case, the same attribute continues to be tested, as indicated by reference numeral 540.

Test 532 checks to determine if the attribute is permanent. This includes the case where the attribute is permanent internal or copied. Permanent internal refers to a supplemental attribute stored in persistent store 516. A copied attribute refers to an external attribute of reference directory 504 that is configured to be stored in persistent store 516. If the attribute is permanent, it is forwarded to buffer 530, as indicated by reference numeral 550. In any case, the same attribute continues to be tested, as indicated by reference numeral 542.

Test 534 checks to determine whether the attribute is external. The attribute is external when the supplemental attribute is stored in reference directory 504. If the attribute is external, it is forwarded to buffer 528, as indicated by reference numeral 552. In any case, the same attribute continues to be tested, as indicated by reference numeral 544.

At test 536 the attribute is checked to determine whether it is replicated. This includes the cases where the attribute is persistent, as described above, and replicated external. Replicated external refers to a supplemental attribute stored in reference directory 504 that is configured to be replicated to peer directory 518. If the attribute is to be replicated, it is forwarded to buffer 526, as indicated by reference numeral 554. In any case, path 546 is then followed returning to test 528 to again check for any attributes not yet processed.

If there are no more attributes to be associated with update 526 to be processed, then path 555 is followed and the contents of the respective buffers are applied as necessary and in any order. The attributes in buffer 532 are applied to non-persistent store 515, as indicated by reference numeral 556. Attributes in buffer 530 are applied to persistent store 516 as indicated by reference numeral 558. Attributes in buffer 528 are incorporated into an update operation, as indicated by reference numeral 560, which is then sent to reference directory 504. Attributes in buffer 526 are incorporated into an update operation, as indicated by reference numeral 562, which is then sent to peer directory 518.

The application of the attributes is consistent with the type of operation. For example, an add-entry would add attributes, a remove-entry would delete attributes, etc. Furthermore, the application of the attributes can be applied at any time, not necessarily waiting full completion of the various tests noted above. Additionally, the update operations 556, 558, 560, and 562 can occur in any order or in parallel.

When update operation 526 performed by a supplemental directory 514 is completed, a result is returned to client 506.

According to another embodiment of the invention, a method and system for automatically registering attribute definitions in a directory server are provided. The directory server may include X.500, LDAP directory servers, or other servers. Normally, attribute definitions must be pre-configured, or the schema configuration of the directory server is changed before a new attribute can be used. According to this aspect of the invention, an attribute is automatically configured during its first use. One advantage of some embodiments of this aspect of the invention is the provision of flexibility of schema. The need to pre-configure every attribute that will be used is removed, which allows applications using the directory to expand the information types they store without reconfiguration, or checking what the configuration is first. The ability to automatically register attributes could have the effect of bypassing schema controls which would not be desirable for operational reasons. Certain embodiments of this aspect of the invention solves this further problem by allowing the selective registration of attributes to be constrained in particular directory objects.

Figure 13:
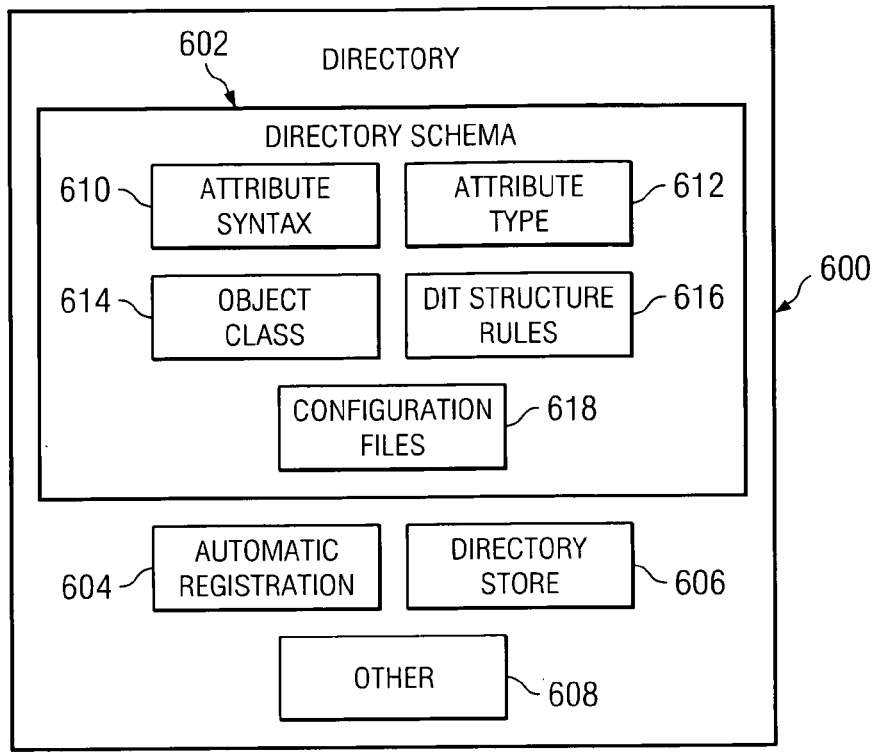
FIG. 13 is a block diagram illustrating a directory system according to another aspect of the invention.

FIG. 13 is a block diagram of a directory 600 according to another embodiment. Directory 600 includes a directory schema 602, automatic registration block 604, a directory store 606, and other components 608. Directory schema 602 is way of controlling what information is stored in directory 600. Automatic registration block 604 controls automatic registration of attributes not previously registered in directory schema 602. Directory store 606 stores underlying data used by directory 600. Other block 608 represents other information stored and additional functionality of directory 600.

In the illustrated embodiment, directory schema 602 includes an attribute syntax 610, an attribute type 612, and object class 614, and directory information tree structure rules 616. Attribute syntax 610 represents a way of encoding an information type such as a string, number, Boolean, date, etc. Attribute type 612 represents the universal name of an attribute. Directory standards formally define the idea of schema and a notation for how to describe it. For example, RFC2256 defines the attribute type "description" as follows:

5.14. Description

This attribute contains a human-readable description of the object.

---

( 2.5.4.13 NAME 'description' EQUALITY caseIgnoreMatch
SUBSTR caseIgnoreSubstringsMatch
SYNTAX 1.3.6.1.4.1.1466.115.121.1.15{1024} )

---

Object class 614 is a special attribute that defines the rules about what attribute types are allowed in each entry. This basically defines which attributes are mandatory ("must contain") and which attributes are optional ("may contain") in an object ("entry"). Directory standards formally define the idea of schema and a notation of how to describe it. For example, RFCC2256 defines the object class "person" as follows:

---

7.7. person
( 2.5.6.6 NAME 'person' SUP top STRUCTURAL MUST
( sn $ cn )
MAY ( userPassword $ telephoneNumber $ seeAlso $
description ) )

---

In any directory implementation, these definitions of object class and attribute type (and indeed as many industry standards as possible) are pre-defined in a products schemic configuration. These definitions are defined in configuration files 618 and one particular example is as follows:

--- schema set oid-prefix attributeType = (2.5.4);
schema set oid-prefix standardObjectClass = (2.5.6);
schema set attribute attributeType:13 = {
    name = description
    ldap-names = description, multiLineDescription
    equality = caseIgnoreMatch -continued

```
        substr = caseIgnoreSubstringsMatch
        syntax = directoryString
    };
    schema set object-class standardObjectClass:6 = {
        name = person
        subclass-of top
        must-contain
            cn,
            surname
        may-contain
            description,
            seeAlso,
            telephoneNumber,
            userPassword
    };
```

If a new attribute type is not defined and the schema is provided in a directory operation, such as an add-entry-request operation, a modified-entry-request with a "add-value" or a modified-DN operation (all of which may introduce attribute types not previously stored in the directory provided they are pre-defined in the schema), an error would normally be returned. Typically this is an attribute error of "undefined attribute type".

Directory information tree structures rules 616 are the rules about how the directory information tree is constructed. For example, allowable parents, allowable naming attributes, and at what depth an object may appear. Further, for example, under an "organization" object, there may be directory information tree structure rules that define that only an "organizationalUnit" object may appear, this object may only be named by an "organizationalUnit" name and there may only be a maximum of, say, four "organizationalUnit" objects under a "organization" object.

The teachings of the invention recognize that this fixed directory schema presents a number of problems. For example, applications that have "plug-in" architectures may not know in advance what information types they need to support. Further, applications installed in operationally sensitive environments may have complicated change control procedures to update configurations. Further, applications may want their attribute definitions to be private and not globally published as is the case with normal directory schema. Teachings of one aspect of the invention address these concerns by providing a system and method for automatically registering attribute definitions, as described above. In particular, automatic registration block 604 includes automatic registration software 620 and a plurality of templates 622. Automatic registration of attribute types is described in greater detail with reference to this FIG. 13 and FIG. 14.

Figure 14:
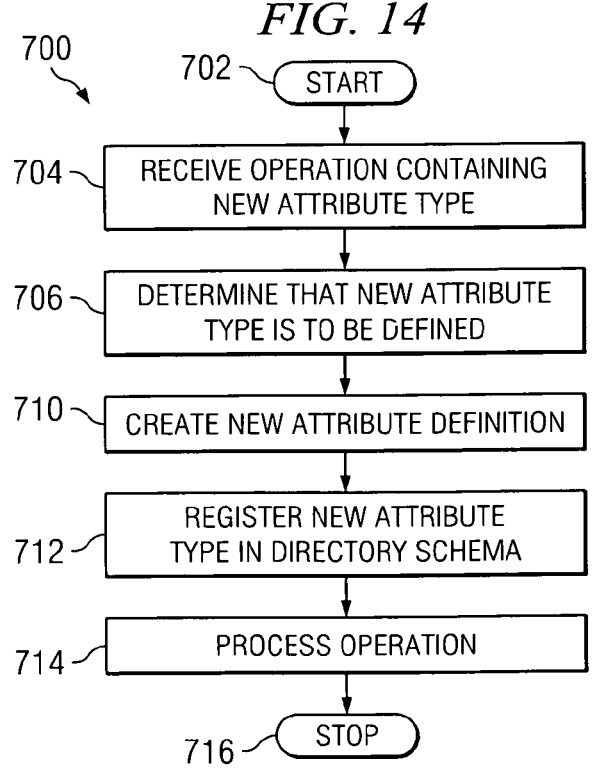
FIG. 14 is a flowchart illustrating automatic registration of a new attribute type.

FIG. 14 is a flowchart illustrating a method 700 for automatically registering an attribute type in directory 600. Method 700 may be performed by automatic registration software 620 or by other suitable method. The method begins at step 702. At step 704 directory 600 receives an operation containing a new attribute type. According to one embodiment, such operations may introduce new attribute types not previously stored in the directory 600 and not predefined in the directory schema 602 and may include an add-entry-request operation, a modified-entry-request with a "add-value" operation, or a modified-DN operation. It will be understood to those skilled in the art that other operations may also be utilized in other embodiments.

At step 706 a determination is made that the new attribute type is to be defined. If the new attribute type is not to be defined, automatic registration does not occur. If the new attribute type is to be defined the automatic registration occurs.

In order to determine if the new attribute type is defined several procedures may be taken. For example, according to one embodiment a search may be performed to determine if the attribute does not exist in directory schema 602. In a further aspect of the invention, the directory schema 602 may reflect which object classes 614 may contain attributes that are automatically defined. This may be implemented in one example by the definition of the object class as follows:

```
schema set object-class standardObjectClass:6 = {
    name = person
    subclass-of top
    must-contain
        cn,
        surname
    may-contain
        auto-register-attributes,
    description,
        seeAlso,
        telephoneNumber,
        userPassword
};
```

The automatic generation of new attribute definitions may be controlled with the use of a flag. This flag may be global, such as "allow-auto-registered-attrs" or defined more tightly, for example, only allowing new attribute types to be automatically generated on operations on specific directory object types or entries or subtrees. The flag may also be used in another embodiment to find new attribute definitions or redefine existing attribute definitions.

At step 710 a new attribute definition is created in response to a determination that the new attribute type is to be defined. In one embodiment, creation of a new attribute type may include an attribute definition based on a template, such as templates 622. One such template may take the form of the following:

```
attribute auto-generated-OID = {
    name = supplied-name
    equality = caseIgnoreMatch
    substr = caseIgnoreSubstringsMatch
    syntax = directoryString
};
```

Numerous other templates are possible. For example, if, by example a new attribute "room" was provided in an add-entry-request operation, the above template would be used and the above:

```
attribute 2.1104.114.111.111.109= {
    name = room
    equality = caseIgnoreMatch
    substr = caseIgnoreSubstringsMatch
    syntax = directoryString
};
```

In the above automatically generated attribute definition, the auto-generated-OID (2.1104.114.111.111.109) is based on the ASCII values of "R" (114), "O" (111), and "M" (109). The prefix of "2.1104" is arbitrarily chosen to signify that this attribute definition has been automatically generated. One of skill in the art will recognize that other arbitrary prefixes may be chosen. Further, other OID generating schemes can be used, such as hash of a name, base 64 encoding, encoding, etc.

As illustrated in automatic registration block 604 of FIG. 13, a plurality of templates 622 are provided in one embodiment. In this embodiment, the particular one of the plurality of templates 622 that is selected based on a variety of factors. For example, a particular template may be based on the new attribute, the type of the object to be operated on, or the value of the new attribute, or selected on other basis. With respect to selecting a template based on the name of the new attribute, an example is provided. In one example, Hungarian notation could be used to indicate the syntax of the value, such as "iXXX" represents a number, "sXXX" represents a string, etc. With respect to the type of object being operated on, if the object class is a person then a string template might be chosen. With respect to the value of the new attribute this may involve, for example, analyzing the value as if it was digits and choosing a number template; if it had a value of TRUE/FALSE/T/F, etc. choosing a Boolean template; and if it parsed in a common date format, choosing a date template, etc.

After definitions of the new attribute type at step 710, the new attribute is registered in directory schema 602. At step 714 processing continues in which the received operation containing a new attribute type is processed. The method concludes at step 716.

Thus, according to this aspect of the invention a method and system are provided that allow automatic registration of attribute types, which provides greater flexibility in handling operations and the avoidance of defined attribute type errors. Further, such automatic registration may occur during processing of operations and do not have to be performed offline.

The teachings of this aspect of the invention recognize that the above-described automatic registration may occur in a directory system or network having a plurality of directories. In such an embodiment each directory, such as directory 600, may include functionality for automatic registration. Thus, when the directory network receives an operation having a new attribute, such as through replication for example, that new attribute may be automatically registered by each respective directory upon receiving an operation having the new attribute, in an analogous manner to that described above with respect to directory 600. In this manner, an entire directory system or network can automatically register a new attribute.

Figure 15A:
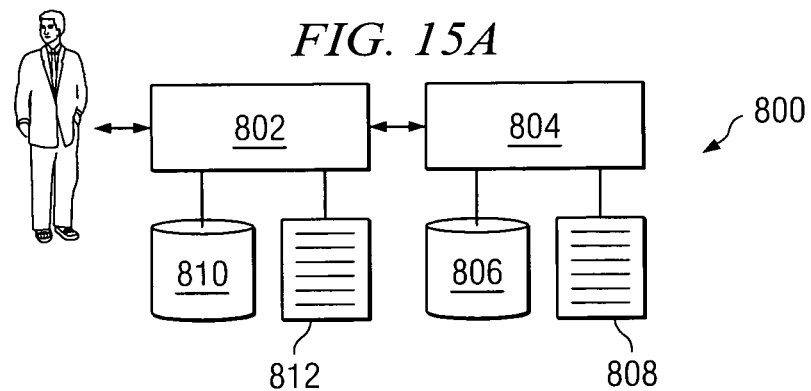
FIG. 15A is a schematic diagram illustrating a directory system according to yet another embodiment of the invention.

FIG. 15A is a schematic diagram illustrating a directory system 800 according to another aspect of the invention. Directory system 800 includes a supplemental directory 802 and a reference directory 804. Directory system 800 may be analogous to directory system 100, described above with reference to FIG. 5. As illustrated, supplemental directory has an associated storage 810 and associated schema 812. Schema 812 includes the definition of attribute types supported by supplemental directory 802. Such attribute types are referred to herein as "internal." In this aspect of the invention, "internal" attribute types need not be initially defined. Rather, internal attributes can be used via the automatic registration of attribute types described above in conjunction with FIGS. 13 and 14.

Reference directory 804 has an associated storage 806 and schema 808. Schema 808 includes the definition of attribute types supported by reference directory 804 referred to herein as "external" attribute types. Also illustrated in FIG. 15A is a user 806 which communicates with supplemental directory 802.

Figure 15B:
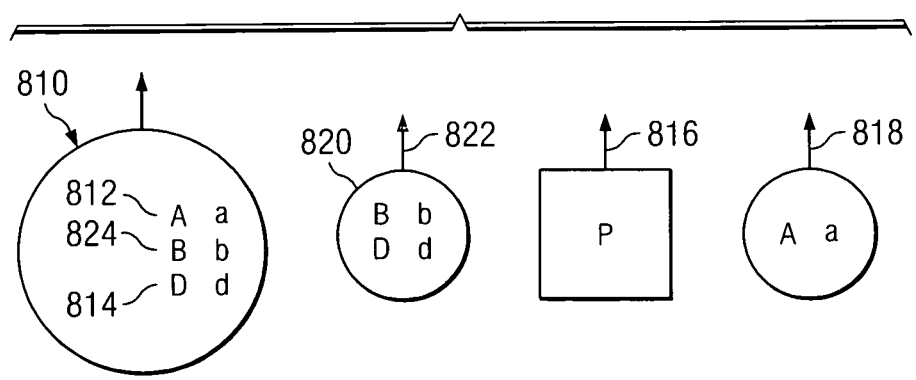
FIG. 15B is a schematic diagram illustrating operations associated with the directory system of FIG. 15A.

FIG. 15B is a schematic diagram illustrating the automatic registration of attribute types in the directory system 800, which involves supplemental directory 802 and reference directory 804. When a client 806 attempts to an update operation, represented by reference numeral 810 in FIG. 15B, which includes existing (already defined) external attribute types 812 and/or existing internal attributes 824 and/or a new (not defined) attribute type 814 in an object, a number of things may happen. A new attribute type 814 is automatically registered in supplemental schema 812, as indicated by reference numeral 816. This automatic registration may occur as described above in conjunction with FIGS. 13 and 14.

According to one embodiment, registration occurs only if the object is marked with "automatic registration" on that object type. If external attributes exist in the add-entry operation, an entry that contains the external attributes 812 is added to reference store 806 in accordance with schema 808, as indicated by reference numeral 818. Further, an entry 820 that contains the internal attributes 814 and 824 is added to supplemental store 810, as indicated by reference numeral 822. Finally, an add-entry confirm response is sent back to client 806.

A similar sequence may also occur for a modified-entry or modified-DN operation. It is noted that these steps can occur in any order. Where the reference schema 808 includes an ability to automatically register attributes, then this aspect can be equally applied to registering the new attribute types in reference schema 808 and adding these attribute values to reference storage 806. If the reference directory 804 does not support automatic registration of attributes but does support some kind of dynamic registration of attributes, then this registration can be included as part of the steps above to make it appear as if the reference directory 804 supports automatic registration of attributes.

Thus, according to one embodiment of this aspect of the invention, reference directory 804 may appear to have dynamically extensible schema because supplemental schema 812 supplements the reference schema 808 with newly defined attribute types. Further, the complexity of schema configuration is reduced, because many attribute types need not be initially configured for the system to operate.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A method of providing an enhanced directory service comprising:

providing, on a data store, a reference layer having reference information, disposing a supplemental layer between a user and the reference layer, the supplemental layer supplementing at least a portion of the reference information with a supplemental layer having supplemental information or supplemental functionality not available from the reference layer due to at least one restriction on operations of the reference layer; and presenting, by a processor having access to the reference layer and the supplemental layer, a single synthesized view of the reference information and the supplemental information or supplemental functionality not available from the reference layer to the user, the single synthesized view allowing the user to see the reference layer as including the reference information and the supplemental information or supplemental functionality not available from the reference layer.

2. The method of claim 1, and further comprising providing, in the Supplemental Layer, a user with additional directory functionality.

3. The method of claim 1, wherein the supplemental information comprises additional attributes, entries, or schema.

4. The method of claim 1, wherein the supplemental information comprises providing access to additional attributes, entries, or schema.

5. The method of claim 1, wherein the supplemental functionality comprises counting entries, providing read or write privileges, providing replication capability, providing distribution capability, providing fail-over capability, or extending schema.

6. The method of claim 1, wherein the supplemental functionality comprises providing access to counting entries, providing read or write privileges, providing replication capability, providing distribution capability, providing fail-over capability, or extending schema.

7. The method of claim 2, wherein providing the user with additional directory functionality comprises providing the user access to a directory feature in addition to that provided by the reference layer.

8. The method of claim 1, wherein the supplemental layer controls a user's access to the reference layer or the reference information.

9. The method of claim 8, wherein the control serves to limit access to reference layer features or information.

10. The method of claim 8, wherein the control serves to enhance access to reference layer features or information.

11. The method of claim 2, wherein providing the user with additional directory functionality comprises providing the user access to a directory performance characteristic different from than that provided by the reference layer.

12. The method of claim 1, wherein the supplemental functionality controls the user's access to a directory performance characteristic.

13. The method of claim 1, wherein the supplemental layer is a supplemental directory storing a plurality of entries and a plurality of attributes and the reference layer is a reference directory storing a plurality of entries and a plurality of attributes.

14. The method of claim 13, wherein the reference directory and the supplemental directory each comprise directory information trees that are compatible with each other.

15. The method of claim 13, wherein the reference directory and the supplemental directory each comprise directory information bases that are compatible with each other.

16. The method of claim 2, wherein providing the user with additional directory functionality comprises providing the user access to a schema not available with the reference layer.

17. The method of claim 2, wherein providing the user additional directory functionality comprises providing additional functionality not available from the reference layer, the additional functionality selected from the group consisting of a security feature, a distribution feature, a replication feature, and a policy feature.

18. The method of claim 2, wherein the additional directory functionality comprises directory operations selected from the group consisting of X.500, Lightweight Directory Access Protocol (LDAP), and Directory Service Markup Language (DSML) standards.

19. A method for providing enhanced directory functionality comprising:
providing, on a data store, a first directory configured to store a first plurality of entries and a first plurality of attributes;
disposing between a user and the first directory a supplemental layer configured to store at least one entry or attribute not included in the first directory due to at least one restriction on operations of the first directory;
providing, by a processor having access to the first directory and the supplemental layer, directory functionality to the user, the directory functionality including access to the first plurality of entries and first plurality of attributes in the first directory and the at least one entry or attribute not included in the first directory; and
presenting, by the processor, to the user a single synthesized view of the first directory and the at least one entry or attribute not included in the first directory, the single synthesized view allowing the user to see the first directory as including the first plurality of entries and the at least one entry or attribute not included in the first directory.

20. The method of claim 19, wherein the first directory and the supplemental layer each comprise directory information trees compatible with each other.

21. The method of claim 19, wherein the first directory and the supplemental layer each comprise directory information bases compatible with each other.

22. A directory system comprising:
a data store comprising a reference layer adapted to provide directory functionality; and
a supplemental layer providing supplemental directory functionality in association with the reference layer having directory functionality, the supplemental layer being adapted to be operative intermediate the reference layer and a user, and
a processor having access to the reference layer and the supplemental layer, the processor operable to present to the user a single synthesized view of the reference layer and at least one entry or attribute not included in the reference layer due to at least one restriction on operations of the reference layer, the single synthesized view allowing the user to see the reference layer as including a first plurality of entries included in the reference layer and the at least one entry or attribute not included in the reference layer.

23. The directory system of claim 22, wherein the supplemental layer comprises a supplemental directory and the reference layer comprises a reference directory.

24. A directory system comprising:
a data store comprising a reference layer adapted to provide directory functionality, and
a supplemental layer being provided intermediate the reference layer and a user, the supplemental layer operable to supplement at least a portion of the reference information with supplemental information or supplemental functionality; and
a processor having access to the reference layer and the supplemental layer, the processor operable to present to the user a single synthesized view of the reference layer and at least one entry or attribute not included in the reference layer due to at least one restriction on operations of the reference layer, the single synthesized view allowing the user to see the reference layer as including a first plurality of entries and the at least one entry or attribute not included in the first directory.

25. The directory system of claim 24, wherein the supplemental layer comprises a supplemental directory and the reference layer comprises a reference directory.

26. A non-transitory computer-readable storage medium comprising a memory, the non-transitory computer-readable storage medium encoded with software operable, when executed on a processor, to:
- access a first directory having a first plurality of entries and a first plurality of attributes;
- access a supplemental directory adapted to store at least one entry or attribute not included in the first directory due to at least one restriction on operations of the first directory;
- provide to a user directory functionality that includes access to the first plurality of entries, the first plurality of attributes, and the at least one entry or attribute not included in the first directory; and
- present to the user a single synthesized view of the first directory and the at least one entry or attribute not included in the first directory, the single synthesized view allowing the user to see the first directory as including the first plurality of entries and the at least one entry or attribute not included in the first directory.

27. The non-transitory computer-readable storage medium of claim 26, wherein the first directory and the supplemental layer each have a directory information tree compatible with each other.

28. The non-transitory computer-readable storage medium of claim 26, wherein the first directory and the supplemental layer each have a directory information base compatible with each other.

29. A directory system comprising:
- a reference directory including a reference directory store being adapted to store a first plurality of entries;
- a supplemental directory including a supplemental directory store being adapted to store a second plurality of entries that does not include at least one of the first plurality of entries due to at least one restriction on operations of the reference directory; and
- a processor having access to the reference directory and the supplemental directory, the processor operable to present to a user directory functionality that includes access to the first plurality of entries and the second plurality of entries; and
- wherein the processor, is further operable to present to a user, as a single synthesized view, directory functionality that includes access to a first plurality of attributes that are stored in the reference directory store and a second plurality of attributes that are stored in the supplemental directory store, the second plurality of attributes including at least one attribute that is not included in the first plurality of attributes.

30. The directory system of claim 29, wherein the reference directory and the supplemental directory comprise directory information trees that are operably associated with each other.

31. The directory system of claim 29, wherein the reference directory and the supplemental directory comprise directory information bases that are operably associated with each other.

32. A directory system comprising:
- a data store comprising a reference directory comprising a data store configured to store a plurality of entries and at least one first attribute that may be associated with one or more of the plurality of entries;
- a supplemental directory comprising a data store configured to store a plurality of entries, at least one of the entries in the supplemental directory having at least one second attribute different from the at least one first attribute due to at least one restriction on operations of the reference directory; and
- a processor having access to the reference directory and the supplemental directory, the processor operable to present to a user directory functionality that includes access to the at least one first attribute and the at least one second attribute, the processor further operable to present to the user a single synthesized view of the first directory and the at least one entry or attribute not included in the first directory, the single synthesized view allowing the user to see the first directory as including the first plurality of entries and the at least one entry or attribute not included in the first directory.

33. The directory system of claim 32, wherein the reference directory and the supplemental directory each include a directory information tree operably associated with each other.

34. The directory system of claim 32, wherein the reference directory and the supplemental directory each include a directory information base operably associated with each other.

35. The directory system of claim 32, wherein the supplemental directory is further operable to present to a user the plurality of entries stored in the supplemental directory and the plurality of entries stored in the reference directory, at least one of the plurality of entries stored in the supplemental directory not stored in the reference directory.

36. A directory system comprising:
- a reference directory comprising a data store configured to store a first plurality of entries and having the capability of associating each of a first set of attributes with each of the first plurality of entries;
- a supplemental directory comprising a data store configured to store a second plurality of entries that does not include at least one of the first plurality of entries, due to at least one restriction on operations of the reference directory, and having the capability of associating each of a second set of attributes with each of the second plurality of entries, the second set of attributes including at least one attribute that is not included in the first set of attributes; and
- a processor having access to the reference directory and the supplemental directory, the processor operable to present to a user directory functionality that includes access to the first plurality of entries and attributes and the second plurality of entries and attributes, the processor further operable to present to the user a single synthesized view of the first directory and the at least one entry or attribute not included in the first directory, the single synthesized view allowing the user to see the first directory as including the first plurality of entries and the at least one entry or attribute not included in the first directory.

37. The directory system of claim 36, wherein the reference directory and the supplemental directory each comprise a directory information tree that is operably associated with each other.

38. The directory system of claim 36, wherein the reference directory and the supplemental directory each comprise a directory information base that is operably associated with each other.

* * * * *